United States Patent [19]

Raab

[11] 4,114,155

[45] Sep. 12, 1978

[54] POSITION DETERMINING APPARATUS AND METHOD

[75] Inventor: Frederick Herbert Raab, Burlington, Vt.

[73] Assignee: Cincinnati Electronics Corporation, Cincinnati, Ohio

[21] Appl. No.: 710,298

[22] Filed: Jul. 30, 1976

[51] Int. Cl.² ............................................. G01S 1/20
[52] U.S. Cl. .......................... 343/105 R; 343/100 CL; 343/103
[58] Field of Search ........ 343/105 R, 100 CL, 112 R, 343/103 R

[56] References Cited

U.S. PATENT DOCUMENTS

| | | | |
|---|---|---|---|
| 3,534,367 | 10/1970 | Laughlin et al. | 343/105 R X |
| 3,852,750 | 12/1974 | Klein | 343/105 R |
| 3,900,876 | 8/1975 | Tsukada et al. | 343/105 R |

OTHER PUBLICATIONS

IEEE Transactions on Aerospace and Electronic Systems, vol. AES11, No. 1, pp. 2-15, Jan. 1975.

*Primary Examiner*—Maynard R. Wilbur
*Assistant Examiner*—Richard E. Berger
*Attorney, Agent, or Firm*—Lowe, King, Price & Becker

[57] ABSTRACT

The position of a receiver responsive to C/A signals derived from multiple, orbiting space crafts is determined to an accuracy of greater than 300 meters. Each of the C/A signals has the same carrier frequency and a different, predetermined Gold code sequence that normally prevents position determination to be more accurate than to within 300 meters. C/A signals transmitted to the receiver are separately detected by cross correlating received Gold code sequences with plural locally derived Gold code sequences. Four of the detected C/A signals are combined to compute receiver position to an accuracy of 300 meters. To determine receiver position to greater accuracy than 300 meters, the relative phase of internally derived Gold code sequences is varied over the interval of one chip of each sequence, to derive second cross correlation values indicative of received and locally derived Gold code sequences; the second cross correlation values represent different positions within the computed 300 meter position. Third cross correlation values indicative of correlations between the internally derived Gold code sequences for the different positions within the computed 300 meter position are determined. Second and third cross correlation values are combined with an indication of the signal amplitude received from each space craft. Combined signals for the different positions are compared with each other. The relative phases of internally derived Gold code sequences that resulted in a minimum value indicate the receiver position within the 300 meter position.

17 Claims, 15 Drawing Figures

FIG. 4a
basic correlation function

FIG. 4b
"early" correlation product
(−1 chip)

FIG. 4c
"late" correlation product
(+1 chip)

FIG. 4d
"delay lock" function = "early-late" used to lock rcvr code generator onto signal
$f(\hat{t}_i) = 0$ when $\hat{t}_i = t_i$

FIG. 4e
interfering cross correlation peak of 2nd. rec'd PRN occurring near auto correlation peak of 1st. rec'd PRN

FIG. 4f
contribution to delay locked loop due to 2nd. rec'd PRN

FIG. 4g
combine d+f resultant delay-lock characteristic and associated $\hat{t}_i$ with error
$f(\hat{t}_i) = 0$ when $\hat{t}_i = t_i +$ error

FIG. 5a our first estimate of the location of the autocorrelation peak from first estimate $\hat{t}_j$ of $t_j$

FIG. 5b its estimated delay lock contribution

FIG. 5c actual contribution

FIG. 5d residual contribution

FIG. 5e resultant delay lock characteristic less distortion smaller error

POSITION DETERMINING APPARATUS AND METHOD

FIELD OF INVENTION

The present invention relates generally to position determining apparatus and methods responsive to a multiplicity of different pseudo random type signals derived from a plurality of known positions, and more particularly to such a system and method wherein the phases of locally derived pseudo random sources are varied over the interval of one chip of the sequence.

BACKGROUND OF THE INVENTION

There is presently under development a position determining system, referred to as the Global Positioning System (GPS), also called NAVSTAR, wherein a multitude of orbiting space craft will be used to enable the position of certain types of receivers to be located relative to the earth. In the system that will ultimately be put into operation, there will be eight orbiting space crafts in each of three sets of orbits so there will be a total of twenty-four space crafts. The three sets of orbits will have mutually orthogonal planes relative to the diameter of the earth so that there will be two sets of polar orbits and one set of equatorial orbits. The space crafts will be in twelve hour orbits and the position of each space craft at any time will be precisely known. The longitude, latitude and altitude of any point close to earth, with respect to the center of the earth, will be calculated by determining the propogation time of electromagnetic energy from four of the space crafts to the point.

To determine the propagation time from each space craft to a point close to earth, electromagnetic energy is transmitted from each space craft to a receiver at the point. Energy on a single carrier frequency from all of the space crafts is transduced by a receiver at a point close to earth. The space crafts from which the energy originated are identified by modulating the carrier transmitted from each space craft with pseudo random type signals. In one mode, referred to as the clear/acquisition (C/A) mode, the pseudo random signal is a Gold code sequence having a chip rate of 1.023 MHz; there are 1023 chips in each Gold code sequence such that the sequence is repeated once every millisecond. (The chipping rate of a pseudo random sequence is the rate at which the individual pulses in the sequence are derived and therefore is equal to the code repetition rate divided by the number of members in the code; one pulse of the noise code is referred to as a chip.) The 1.023 MHz Gold code sequence chip rate enables the position of the receiver responsive to the signals transmitted from four of the space crafts to be determined to an accuracy of 300 meters. There is a second mode, referred to as the precise or protected (P) mode wherein pseudo random codes with chip rates of 10.23 MHz are transmitted with sequences that are extremely long, so that the sequences repeat no more than once per week, which enables the receiver position to be determined to an accuracy of approximately 10 meters. However, the P mode requires relatively complex receivers and is intended for use only by authorized receivers. Hence, civilian and/or military receivers that are apt to be obtained by unauthorized users are not responsive to the P mode.

To enable the receiver to separate the C/A signals received by it from the different space crafts, the receiver includes a plurality of different Gold code sources, each of which corresponds with the Gold code sequence transmitted from one of the space crafts in the field of view of the receiver. The locally derived and received Gold code sequences are cross correlated with each other over the one millisecond, Gold code sequence intervals. The phase of the locally derived Gold code sequence is varied, on a chip by chip basis, and then within a chip, until the maximum cross correlation function is obtained. Since the cross correlation for two Gold code sequences having a length of 1023 bits is approximately sixteen times as great as the cross correlation function of any of the other combinations of Gold code sequences, it is relatively easy to lock the locally derived Gold code sequence onto the same Gold code sequence that was transmitted by one of the space crafts. The Gold code sequences from four of the space crafts in the field of view of the receiver are separated in this manner by using a single channel that is sequentially responsive to each of the locally derived Gold code sequences, or by using parallel channels that are simultaneously responsive to the different Gold code sequences. After four locally derived Gold code sequences are locked in phase with the Gold code sequences received from four space crafts in the field of view of the receiver, the position of the receiver can be determined to an accuracy of 300 meters. The 300 meter accuracy of GPS is determined by the number of space crafts transmitting signals to which the receiver is effectively responsive, the variable amplitudes of the received signals and the magnitude of the cross correlation peaks between the received signals from the different space crafts. In response to reception of multiple PRN (pseudo range noise) signals, there is a common time interval for some of the codes to likely cause degradation in time of arrival measurements of each received PRN due to the cross correlations between the received signals. The time of arrival measurement for each PRN is made by determining the time of a peak amplitude of the cross correlation between the received composite signal and a local Gold code sequence that is identical to one of the transmitted PRN. When random noise is superimposed on the received PRN, increasing the averaging time of the cross correlation between the received signal and a local PRN sequence decreases the average noise contribution to the time of arrival (hence distance) error. However, because the cross correlation errors between the received PRN's are periodic, increasing the averaging time increases both signal and the cross correlation value between the received PRN alike and time of arrival errors are not reduced.

It is an object of the present invention to provide new and improved apparatus for and method of enabling the position of a receiver responsive to a plurality of pseudo random type sequences from a plurality of sources having a known position to be determined.

It is a more specific object of the invention to provide an apparatus for and method of enabling the position a relatively stationary receiver responsive to the C/A signals transmitted from a plurality of space crafts of the GPS to be determined to an accuracy of greater than 300 meters.

Another object of the invention is to provide an apparatus for and method of enabling the position of a receiver responsive to a multiplicity of C/A signals to determined to an accuracy greater than 300 meters wherein a considerable portion of the apparatus utilized for determining position to an accuracy of 300 meters is employed.

While the present invention is described in connection with determining the position of a receiver responsive to the C/A signal of the GPS, it is to be understood that the principles of the invention are applicable to any system for determining the position of a relatively stationary or slowly moving receiver responsive to pseudo random type sequences. The term "slowly moving" refers to a receiver that derives an output at a particular spatial position such that a computer responsive to the output indicates the position prior to the receiver moving to another position where the computer will respond to the outputs to indicate a different position. However, if sequences and bit rates different from the C/A signal of the GPS are employed from multiple stations having known positions, the principles of the invention are applicable.

BRIEF DESCRIPTION OF THE INVENTION

In accordance with the present invention, the position of a relatively stationary or slowly moving receiver responsive to the C/A, PRN signal is determined to an accuracy of within less than 300 meters by adjusting the phase of the Gold code sequences derived at the receiver within the period of one bit of the sequence after the locally derived sequences have been locked onto the received sequences. By varying the phase of the locally derived sequences within the interval of one bit of the sequence, the effective position of the receiver is effectively moved over the 300 meter position, insofar as the propagation time of the energy from the space crafts to the receiver is concerned. Preferably, the phases of the different sequences are varied in a programmed manner to simulate the position of the receiver at a number of discrete points within the 300 meter position determination capability of the C/A mode. The cross correlation values between the received and locally derived sequences for each of the space crafts in the field of view are determined at each simulated position. The cross correlation values for one position are combined to derive an indication of that simulated position likely being the actual position. The indications of the different simulated positions are compared to select the simulated position having the greatest probability of being the receiver position within the region determined by the normal C/A mode. Hence, in the present invention, the cross correlation products between the received PRN's from the different space crafts are estimated from the received signals and the estimated products are subtracted from the received PRN's. In contrast, prior art systems simply accept the degradation inaccuracy produced by the cross correlation products between the received PRN's.

The present invention requires a minimum amount of additional hardware at the receiver to enable the receiver position to be determined with greater accuracy. In particular, the same Gold code sources and auto correlation computing apparatus can be utilized. It is only necessary to provide a phase shifter having a resolution to within a fraction of a bit of each Gold code sequence, as well as a programmer to step the phase shifter to a number of different values, corresponding with different discrete positions within the 300 meter C/A mode accuracy range. While additional computer functions are required, the computer can be located at a remote location and be responsive to correlation functions that are locally derived at the receiver. Also, the computer operations can be attained through the use of software and thereby may not require additional hardware implementation.

The above and still further objects, features and advantages of the present invention will become apparent upon consideration of the following detailed description of one specific embodiment thereof, especially when taken in conjunction with the accompanying drawing.

DETAILED DESCRIPTION OF THE DRAWING

Figure 1:
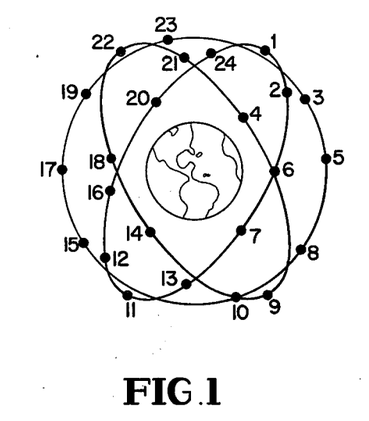
FIG. 1 is a schematic view of the GPS System in final form.

Reference is now made to FIG. 1 of the drawing wherein the configuration of the fully operational GPS System is schematically illustrated. Twenty-four medium orbiting space crafts in three sets of mutually orthogonal orbits include means for continuously transmitting unique identifying signals on a common carrier frequency. In each set of orbits, eight space crafts are provided; two of the sets of orbits are polar, while the third set of orbits is equatorial whereby a receiver at any point on the face of the earth, or in proximity thereto, is responsive at any time to signals transmitted from between six and eleven space crafts.

In the C/A mode, each of the twenty-four space crafts transmits a different pseudo random type binary signal that biphase modulates the same carrier frequency; in particular, the pseudo random type signal is a Gold code sequence having a length of 1023 chips that repeats itself once every millisecond. To enable the signals from the different space crafts to be separated, the Gold code sequence transmitted from each space craft has a low cross correlation with other Gold code sequences that are transmitted by the other satellites.

As is well known, a Gold code sequence is the product of two primitive polynomials of the same degree (N). When the two primitive polynomials are multiplied together, $2^N + 1$ different sequences, each having a length $2^N - 1$, are derived. A primitive polynomial is defined as a binary polynomial of degree N, wherein the roots of the polynomial are the primitive $2^N - 1$ roots of unity. In turn, the primitive Nth root of unity is the value of N that is the smallest number for which $Z^N = 1$, where Z is a real or complex function. A truly pseudo-random sequence is generated by a primitive polynomial. Examples of primitive polynomials of degree 6 ($N = 6$) are:

$$f_1(X) = X^6 \oplus X \oplus 1 \qquad (1)$$

$$f_2(X) = X^6 \oplus X^5 \oplus X^2 \oplus X \oplus 1 \qquad (2)$$

Each of Equations (1) and (2) can be derived by utilizing a six stage feedback register and an EXCLUSIVE OR gate. For the function of Equation (1), the EXCLUSIVE OR gate responsive to the output signals of the first and sixth stages of the feedback shift register supplies an input signal to the shift input of the first stage; the function of Equation (2) is synthesized by connecting the outputs of the first, second, fifth and sixth stages of a second shift register to the input of an EXCLUSIVE OR gate which derives an output that is supplied to the shift command of the first stage of the second shift register. A Gold code sequence having a length of sixty-three bits and a function represented by:

$$f_1(X)f_2(X) = X^{12} \oplus X^{11} \oplus X^8 \oplus X^6 \oplus X^5 \oplus X^3 \oplus 1 \qquad (3)$$

is derived by multiplying, in an EXCLUSIVE OR gate, the output signals of feedback shift registers that derive the functions of Equations (1) and (2). For additional information on Gold code sequences, attention is directed to the October 1967 IEEE Transactions on Information Theory, for the article written by R. Gold entitled "Optimal Binary Sequences For Spread Spectrum Multiplexing".

A receiver responsive to a number of Gold code sequences is able to separate them by correlating the received sequences with locally derived sequences that are identical to the transmitted sequences, provided the different sequences have relatively low cross correlation values. The separation is achieved by cross correlating the received sequences with each of the locally derived sequences and shifting the phases of the locally derived sequences, on a chip by chip basis, and then within a chip, until there is obtained a maximum cross correlation value between the received and locally derived sequences.

Figure 2:
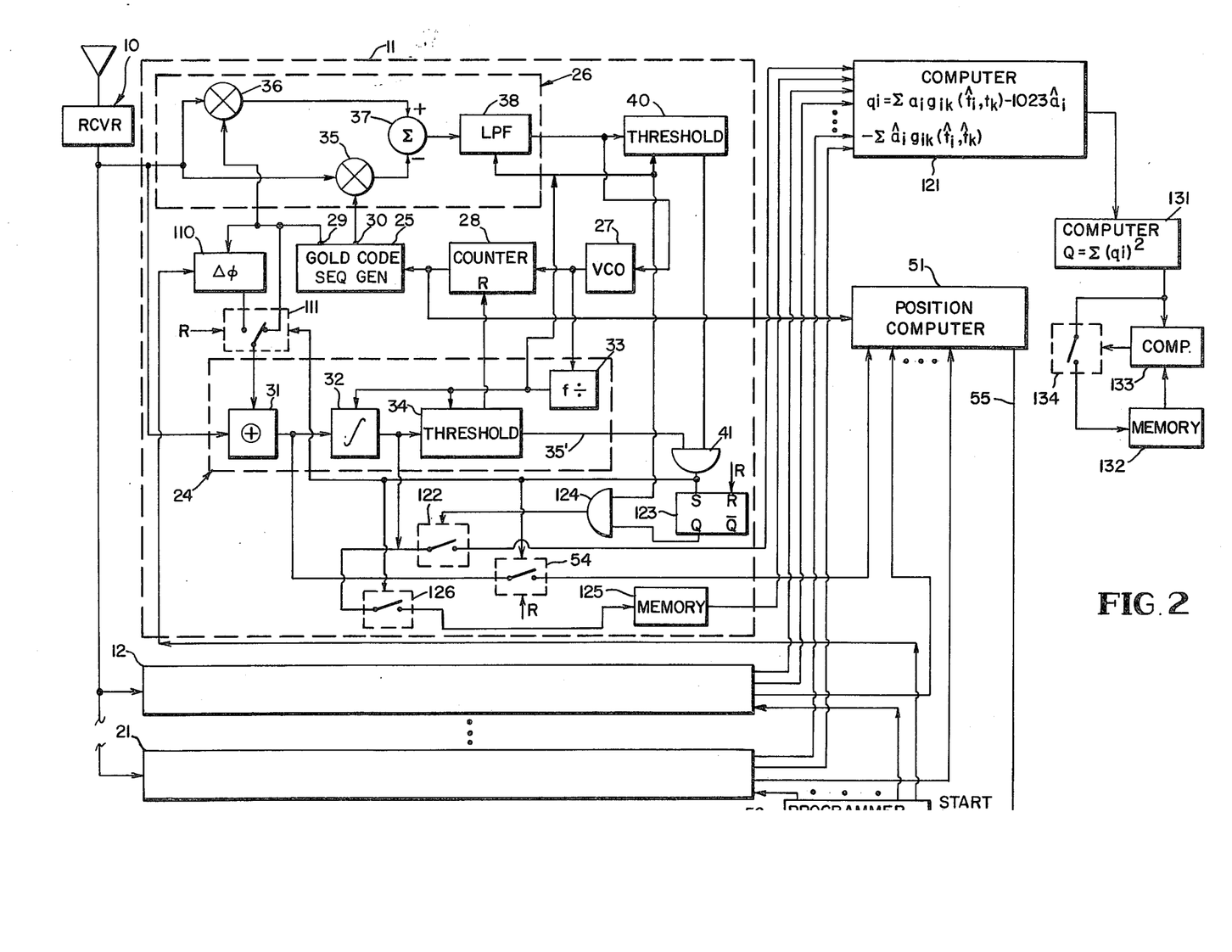
FIG. 2 is a block diagram of the apparatus included in the present invention.

In the GPS, each Gold code chip enables the position of a receiver responsive to the signals from the satellites to be determined, utilizing conventional techniques, to within 300 meters. The one millisecond Gold code sequence length, i.e., epoch, enables the position of the receiver to be determined, without ambiguity, to within 300 kilometers. By responding to the Gold code, as transmitted from four space crafts to a receiver on or near the surface of the earth and by knowing the position of the four space crafts at any time instant, a computer is able quickly to determine the position of the receiver. To this end, at each receiver site there is provided a computer responsive to the information to determine the receiver position to an accuracy of within 300 meters. In the alternative at each receiver there may be provided a transmitter which relays information back to a central computer, via a link that usually includes a space craft. For purposes of simplifying the presentation herein, the computer is assumed to be at the receiver location. The techniques for computing the position of the receiver, in three coordinates (longitude, latitude and altitude) are known. For further information on GPS, attention is directed to (1) NAVSTAR Global Positioning System: A Joint Service Program, prepared by Deputy for Space Navigation System, Headquarters SAMSO, Los Angeles, Calif., 1974, (2) Systems Specification for the NAVSTAR Global Positioning System, Phase 1, SS-GPS-101B, SAMSO, YEN, El Segundo, Calif. 1974, and (3) GPS-DILG Interface Study (Final Report), 80045 ARS 26/275. In accordance with the present invention, a relatively stationary or slowly moving receiver 10 close to or on the surface of the earth, e.g., a receiver on a large ship, responds to the C/A signals transmitted from all of the satellites in the receiver field of view to compute the position of the receiver to an accuracy of greater than 300 meters, i.e., the receiver position is determined to a region having a cross dimension of less than 300 meters. The shape of the region if variable, depending upon the relative positions of the receiver and the space craft. If the region is circular, the cross dimension is the diameter of a circle having a radius of 150 meters. A block diagram of one preferred embodiment of the receiver is illustrated in FIG. 2.

Receiver 10 is tuned to the common carrier frequency transmitted from all twenty-four space crafts of FIG. 1 to derive a baseband signal containing all of the Gold code sequences transduced by the receiver at any instant. In actuality, the signals from the different space crafts may be frequency shifted relative to each other because of Doppler resulting from space craft motion. The receiver corrects for the shifts by tracking the carrier frequency of each space craft and slightly varying a local oscillator mixing frequency for each space craft. Since the net effect is to derive a common carrier frequency for all of the space crafts and the tracking, as well as shifting, apparatus is well known to those skilled in the art, a single output lead from receiver 10 is illustrated. The baseband signal is supplied in parallel to eleven signal processing channels 11, 12 . . . 21, one of which is provided for each space craft that can communicate with receiver 10 at any time. Since the number of space crafts communicating with a receiver on or in proximity to the surface of the earth is six to eleven, programmed circuitry (not shown) is provided to control which of the channels are operative at any instant and the Gold code sequences that are generated in each channel. Since each of the processing channels 11, 12 . . . 21 is substantially the same, except for the Gold code sequence generator, a description of the apparatus included in channel 11 suffices for the remaining channels. It is to be understood that a single processing channel, sequentially responsive to a multiplicity of Gold code sequences can be used, in lieu of the parallel channel processors. In such an event the data for each space craft is stored in memory and when the data from all of the space crafts in the field of view have been processed, the receiver position is calculated.

Signal processing channel 11 includes acquisition circuit 24 for enabling local Gold code sequence generator 25 to derive a Gold code sequence having chips that occur at the same time as chips in one of the received and detected sequences. The sequence derived from generator or source 25 is identical to one of the sequences transmitted from one of the space crafts that is communicating with receiver 10. After the local and received sequences have the same chip positions, the phase of the local sequence is adjusted, over the interval of one chip, by lock circuit 26 until a maximum cross correlation exists over the interval of one Gold code sequence between the received and local sequences. The position of receiver 10 can then be determined as being in a particular region having a cross dimension of 300 meters. Thereafter, the phase of the local sequence is varied over the interval of one chip by programmer 27 to simulate reception by receiver 10 of the sequence at numerous points within the 300 meter region.

The Gold code sequences transmitted from the different space crafts are arranged so that a maximum cross correlation product between any two of them is 65 whereas the autocorrelation product of Gold code generator 25 of channel 11 and the same Gold code sequence transmitted from one of the space crafts is 1023 The correlation value is defined, for this purpose, as the number of identical bits in a 1023 bit epoch of a Gold code sequence. When the phase of local Gold code generator 25 is adjusted so that the maximum cross correlation value is derived, the locally derived Gold code sequence has the same phase as the Gold code sequence that is coupled to receiver 10, whereby the time of the local code can be used as an indication of the position of the receiver.

Prior to considering acquisition circuit 24 and lock circuit 26, consideration is given to the circuitry of Gold code sequence generator 25 that enables acquisition and lock to be achieved. As indicated supra, generator 25 derives the sequences of interest by combining the output signals of a pair of feedback shift registers in an exclusive OR gate. However, to achieve lock, it is necessary to derive a pair of simultaneous outputs from the Gold code sequence generator 25, which outputs are displaced from each other by two chip positions. To this end, the output of the exclusive OR gate in generator 25 is supplied to a load input of the first stage of a three stage shift register in the generator. The three stage shift register is clocked simultaneously with the stages of the two feedback registers. Signals are derived from output terminals 29 and 30 of the first and third stages of the three stage register to enable identical output sequences, having a phase displaced by two chips, to be simultaneously derived.

Basically, acquisition circuit 24 and lock circuit 26 control the rate at which Gold code sequence generator 25 is clocked by the variable frequency and phase output of voltage controlled oscillator 27 that drives clock inputs of the shift registers included in generator 25 via resettable counter 28. When acquisition and lock have been achieved, counter 28 supplies clock pulses to generator 25 at a frequency of 1.023 mHz, so that the chipping rate of the generator is the same as that of the baseband output of receiver 10 and the sequence derived from the generator has the same time position as one of the sequences derived by the receiver.

Acquisition circuit 24 controls counter 28 to selectively remove pulses supplied by oscillator 27 to the clock input of generator 25 by resetting counter 28 in response to the cross correlation between the output of generator 25 and the received signal having a value of less than 65 over the interval of a complete sequence. The cross correlation is derived by multiplying, in exclusive OR gate 31, the output of generator 25, as derived from terminal 29, with the baseband output of receiver 10. The resulting binary output of exclusive OR gate 31 is applied to integrator 32 that is reset once each millisecond, after a complete Gold code sequence has been correlated by gate 31 and integrator 32. Integrator 32 is reset by feeding the output of oscillator 27 to frequency divider 33; the center frequency of oscillator 27 and frequency division factor of divider 33 are such that an output is derived from the divider approximately once every millisecond. Immediately prior to integrator 32 being reset, the output of the integrator is sampled in response to threshold circuit 34 being activated by the output of frequency divider 33 slightly before the integrator is reset. Threshold circuit 34 derives a binary one output on lead 35 in response to the output of integrator 32 being less than the maximum cross correlation product of 65 between any two different Gold code sequences transmitted from the different space crafts. The interval of a complete sequence for arriving at a division regarding acquisition is given for purposes of simplicity. It is to be understood, however, that the division process depends on signal-to-noise ratio and the strategy employed. In the case of GPS, a basic decision requires 32 code repetitions, i.e., about 32 milliseconds. By using sequential detection, the process time can be reduced to eight code repetitions. Regardless of the ratio and the strategy, at least one complete sequence is required.

When threshold detector 34 derives a binary one output on lead 35, an indication is derived that the sequence derived from generator 25 is displaced by at least one chip from the corresponding sequence derived from receiver 10. The binary one signal on lead 35 resets counter 28 to zero, to change the frequency division factor introduced by the counter on the output of oscillator 27, as coupled to the clock input of generator 25. Thereby, the number of pulses coupled to the clock input of generator 25 is changed over a millisecond sequence interval and there is a one chip shift in the sequence derived by the generator. The sequence derived by generator 25 is shifted, on a chip by chip basis, in this manner until the input to threshold detector 34 exceeds the voltage associated with the maximum cross correlation product of 65 between two different Gold code sequences, at which time the Gold code sequence of generator 25 is aligned, on a chip by chip basis, with one of the sequences derived from receiver 10. At this time, lock circuit 26 adjusts the phase of the output of voltage controlled oscillator 27 until a maximum cross correlation exists between the sequence derived from generator 25 and the corresponding sequence at the output of receiver 10. The phase adjustment causes an intra chip shift in the time position at output terminals 29 and 30 of generator 25.

To this end, locking circuit 26 is a binary delay-lock tracking loop of the type disclosed by Gill in the July, 1966 IEEE Transactions on Aerospace and Electronics Systems, pages 415–424. In particular, locking circuit 26 includes a pair of mixers 35 and 36 that are driven in parallel by the output of receiver 10. Mixers 35 and 36 are respectively responsive to the two time displaced output sequences of generator 25, as derived from output terminals 29 and 30. The outputs of mixers 35 and 36 are linearly combined in subtraction network 37 that derives an output signal having an amplitude proportional to the output of mixer 36 minus the output of mixer 35. The resulting output of combining network 37 is applied to low pass filter 38, which derives an output that is coupled to the frequency control input of oscillator 27. When the corresponding sequences of generator 25 and the output of receiver 10 are aligned to within one chip of each other, a finite output is derived from filter 38 until there is phase lock between the two sequences. Thereafter, locking circuit 26 maintains the phase of oscillator 27 such that the sequence derived from generator 25 is exactly in phase with the corresponding sequence derived from receiver 10.

For certain operations discussed infra, it is necessary to derive a signal when lock-on has been achieved. Lock-on is achieved when the cross correlation between the output of generator 25 and the output of receiver 10 exceeds 65 while a zero voltage is derived from low pass filter 38. To sense a cross correlation in excess of 65, threshold detector 34 includes a second output lead 35' on which is derived a binary one level each time the sampled input to the threshold detector from integrator 32 exceeds the level necessary to derive from low pass filter 38, the output of the low pass filter is applied to threshold detector 40 which derives a binary one level in response to the filter output being zero; for all other outputs of filter 38, threshold detector 40 derives a binary zero level. Threshold detector 40 is enabled simultaneously with detector 34 by applying the output of frequency divider 33 to detector 40. The output signals of threshold detectors 34 and 40 are combined in AND gate 41 that derives a binary one level when lock-on has been achieved.

Once each of the local Gold code generators 33 has become locked to the corresponding received Gold code sequence, the position of receiver 10 is determined to an accuracy of within 300 meters. The receiver position is calculated by position computer 51 that is driven by the 1.023 MHz output of counter 28. Computer 51 is of a type known to those skilled in the art, and may be either a hard wire specially designed computer or a programmed general purpose digital computer of the scientific type. Computer 51 determines the relative time of arrival of each of the sequences from the various space crafts by comparing the time position of pulses derived from counter 28 with epochs of demodulated Gold code sequences generated in each of channels 11, 12 . . . 21.

To these ends, the output of EXCLUSIVE OR gate 31 is coupled to computer 51 once lock-on has been achieved. When lock-on has been achieved, AND gate 41 derives a binary one input to latch switch 54 into the closed position, whereby the output of EXCLUSIVE OR gate 31 is coupled to the input of computer 51. Switch 54 remains latched closed until a reset pulse is supplied to its input in response to a manual command signal being derived the next time the receiver is put into operation. Since the receiver of the present invention is generally utilized in connection with relatively stationary or slowly moving objects, it is not necessary to continuously latch and unlatch switch 54. The output signals of the EXCLUSIVE OR gates 31 of channels 11, 12 . . . 21 are supplied to computer 51 with the output of counter 28. Computer 51 responds to its input signals, as well as stored signals indicative of the known positions of four space crafts in the field of view of receiver 10, to compute the position of the receiver to an accuracy of within 300 meters. Virtually all of the apparatus described to the present time in the detailed description is known and forms part of conventional receivers responsive to the C/A GPS signal.

In the prior art, after acquisition and lock-on have been achieved, the output signals from only four of channels 11–21 are supplied to a computer which utilizes hyperbolic techniques for determining receiver position to within 300 meters. The selection of which channels feed the computer is based on which space crafts have the best geometry with the approximate position of the receiver, i.e., which of the space crafts have links with the lowest signal-to-noise ratios to the receiver. The codes from the four selected space crafts are varied separately in fractional chip steps to determine the correlation peak of each. In the absence of noise and cross correlation interference, time of arrival measurements for the Gold code sequence from each of the four space crafts produce a position estimate to within 300 meters. If signal and propagation stabilities are poor, the position estimate is likely to be in a region having a cross dimension of greater than 300 meters.

A more sophisticated prior art receiver includes the remaining channels, e.g., channels 15, 16, . . . 21, each of which similarly delay locks its input signal to measure the time-of-arrival, or correlation peak time. These measurements are combined with four time-of-arrival measurements from the four channels having the greatest signal to noise ratio, e.g., channels 11–14, to produce an optimum (minimum squared error) estimate of position. Combination is done by weighting different measurements according to their signal-to-noise ratio and geometric dilution of position. A discussion of such techniques is given by H. Lee, "A Novel Procedure for Assessing the Accuracy of Hyperbolic Multilateration Systems", *IEEE Transactions on Aerospace and Electronic Systems,* vol. AES-11, no. 1, pp. 2–15, January 1975. Basically, this is a variant of the familiar idea of increasing the number of samples to decrease the variance in an estimate. It finds use in a noisy environment; however, for practical considerations, most receivers would simply average the four signals for a longer period of time to reduce noise. There may coincidentally be a decrease in cross correlation effects, since not all of the received signals produce cross correlation peaks. However, the inclusion of the additional signals could as well add the effects of a cross correlation peak to an otherwise good measurement. The receiver has no way of knowing what happens.

According to the present invention, the receiver responds to all eleven of the measurements and acts on them to obtain an optimum position estimate, considering, rather than ignoring the cross correlation products among the signals. The receiver employs the same delay-lock functions to measure the times-of-arrival (correlation peaks) as in the prior art receivers mentioned above. The difference is the consideration of the cross correlation products of all the received signals.

Figure 3:
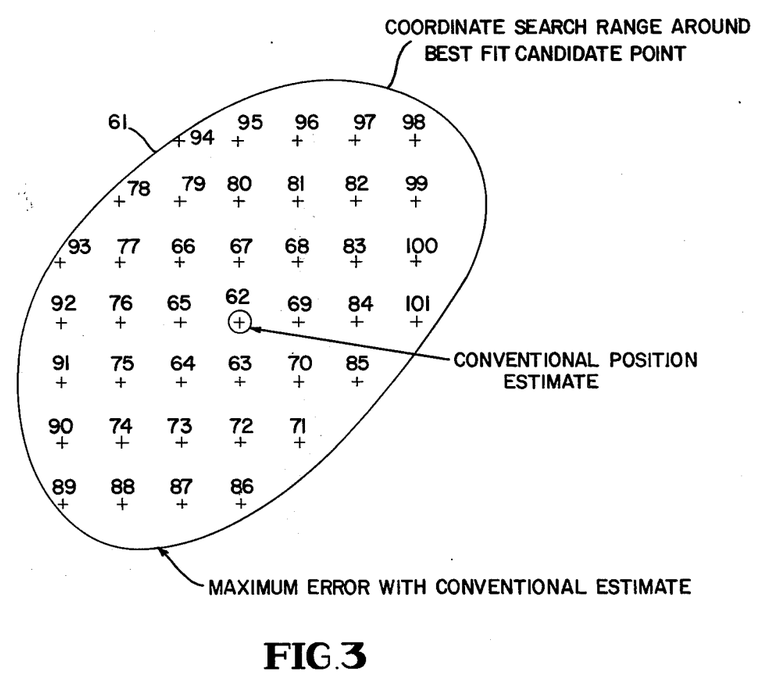
FIG. 3 is a chart useful in understanding how the present invention functions to determine the position of a receiver with greater accuracy than can normally be attained with the C/A mode.

After computer 51 has responded to the signals from four of channels 11, . . . 21 to compute the position of receiver 10 to an accuracy of 300 meters, it derives an output signal on lead 55 to initiate the operations associated with determining the position of the receiver to an accuracy of better than 300 meters. The operations involved in determining the position of receiver 10 to an accuracy of better than 300 meters involve effectively shifting the position of the receiver, by electronic means, so that the receiver assumes a multiplicity of discrete locations within the 300 meter region to which the position has been determined by computer 51. For example, as illustrated in FIG. 3, the position of receiver 10 is determined by computer 51 to a region having a perimeter defined by a closed curve 61, the center of which is point 62. Point 62 represents the position associated with the Gold code generators 25 of channels 11, 12 . . . 21 when an output pulse is derived from computer 55.

To determine the position of the receiver to a greater accuracy, the relative phases of the sequences derived from the Gold code generators 25 of all eleven channels 11, 12 . . . 21 are varied by programmer 56 to simulate positions associated with points 63, 64, 65 . . . 100, 101. The phases of Gold code generators 33 of the different channels are varied over the period of one bit of the 1.023 MHz source that drives the shift command of the Gold code generator to simulate receptions from the space crafts at the different points within the region defined by curve 61. The correlation functions for each of channels 11, 12 . . . 21 are computed for each of the positions and combined with an estimate of the amplitude of the signal received by receiver 10 from each space craft, as well as the cross correlation functions of the locally generated Gold code sequences, as derived from generators 25 of channels 11, 12 . . . 21. The fit between the locally generated Gold code sequences and the received Gold code sequences, for each of the assumed points 63–101 within region 61, is determined and the best fit of all of these points is assumed to be the position of the receiver within region 61.

To these ends, channel 11 includes an intrabit phase shifter 110 that is connected between the output terminal 29 of generator 25 and one input of EXCLUSIVE OR gate 31 when lock-on has been achieved; phase shifter 110 is connected in circuit by providing single pole double throw switch 111 having first and second terminals respectively connected to the output of phase shifter 110 and terminal 29 and an armature connected to gate 31. Normally switch 111 connects terminal 29 to gate 31, as described supra, but is latched to connect phase shifter 110 to the gate after lock-on has been achieved by coupling the binary one output of AND gate 41 to a control input of the switch,. Switch 111 remains latched to connect phase shifter 110 to gate 31 until a reset input (R) is supplied thereto simultaneously with latched switch 54 being reset. Intrabit phase shifts can also be inserted by applying a suitable input to voltage controlled oscillator 27 after lock-up has been achieved.

The amount of phase shift introduced by phase shifter 110 on the signal coupled by oscillator 36 to the shift input of generator 33 is controlled in discrete steps by the output of programmer 56. Phase shifter 110 is a delay element, such as a one shot having a variable time constant that is controlled by the output level of programmer 56. For example, to effectively change the position of receiver 10 from point 62 to point 63, the phase shifts of intrabit phase shifters 110 of channels 11, 12, ... 21 are changed over a first set of values $\phi 111$, $\phi 112$, ... $\phi 121$ over a fraction of a cycle of the clock input to generator 25 from counter 28. To shift the effective position of receiver 10 from point 63 to point 64, the phase shifts introduced by phase shifters 110 of channels 11, 12, ... 21 are changed over a second set of values $\phi 211$, $\phi 212$, ... $\phi 221$. To effectively translate receiver 10 to the position indicated by point 65, the phases of phase shifters 110 of channels 11, 12, 21 are changed over a third set of values $\phi 311$, $\phi 312$, ... $\phi 321$. In general, for each new position, there is a change in phase shift for each channel; however, if two lines are perpendicular, one of the channels has a zero phase shift. In a similar manner, the effective position of receiver 10 is moved to succeeding points 66–101 by introducing differing amounts of discrete phase shifts over the interval of one period of oscillator 36.

For each assumed position, $m$, within the region defined by curve 61, computer 121 responds to: (a) the cross correlation values derived from integrators 31 of channels 11, 12, ... 21, (b) the cross correlation values of the sequences derived from the Gold code generators 25 of channels 11, 12, ... 21, and (c) the amplitude of the signals received by receiver 10 from each of the space crafts. Mathematically, the output ($q_i$) of computer 121 is expressed as:

$$q_i = a_1 g_{11}(\hat{t}_1, t_1) + a_2 g_{12}(\hat{t}_1, t_2) + \ldots + a_k g_{k1}(\hat{t}_1, t_k) - 1023\hat{a}_1 - \hat{a}_2 g_{12}(\hat{t}_1, \hat{t}_2) - \ldots - \hat{a}_k g_{1k}(\hat{t}_1, \hat{t}_k) \quad (4)$$

where:

$q_i$ represents the contribution from each space craft for an assumed position $m$ within the region defined by curve 61 and is therefore a term analogous to the error in the agreement of the predicted cross correlations with the measured correlations for the signal from the $i^{th}$ space craft;

$a_i$ = the amplitude of the signal from the $i^{th}$ space craft;

$g_{ij}(u, v)$ = the cross correlation value between the $i^{th}$ and $j^{th}$ Gold sequences, with epochs having times of arrival occuring at times $u$ and $v$, respectively;

$g_{ij}(\hat{t}_i, t_j)$ = the actual cross correlation product between the $i^{th}$ and $j^{th}$ signals, which occurs when the true epoch time of the $j^{th}$ sequence is $t_j$ and the receiver has estimated (in response to the output of delay lock circuit 26) the epoch time of arrival of the $i^{th}$ sequence to be $\hat{t}_i$; and $g_{ij}(\hat{t}_i, \hat{t}_j)$ = the estimate by the receiver of $g_{ij}(\hat{t}_i, t_j)$, based on estimated epoch times of arrival $\hat{t}_i$ and $\hat{t}_j$. This value is derived by computer 121 based on knowledge of the structure of the two code sequences.

The use of a "hat" (ˆ) over a symbol indicates an estimated value which is derived by an operator from an analysis of the output of lock up circuit 26, the signal in each channel or stored information in computer 121. The same symbol without a "hat" indicates a true, measured value. For the estimated values there is no way that the parameter can be measured at the receiver and it is necessary to employ estimates from prior information regarding the approximate relative positions of the space crafts and the receiver. Computer 121 responds to the output of phase shifter 110, that responds to Gold code generator 25 of each of the channels at each of the simulated positions 62, ... 101 to compute the cross correlation values between the Gold code generators of the several channels once and sums them all together. At each of the simulated positions the sum of the cross correlation values of the locally derived Gold code sequences is multiplied by the estimate, represented by $\hat{a}_k$, of the particular channel $k$ to form the last term of Equation (4).

To couple the cross correlation values $a_1 g_{11}(\hat{t}_1, t_1) + g_{12}(\hat{t}_1, t_2) + \ldots + q_{1k}(\hat{t}_1, t_2)$ derived from integrator 32 of channel 11 into computer 121 once each Gold code sequence epoch, after lock-up has been achieved, the output of the integrator is coupled to the computer through switch 122. Switch 122 is closed once each cycle after lock-up has been achieved by feeding the binary one output of AND gate 41 to a set input of flip-flop 123, having a principal (Q) output that is coupled to one input of AND gate 124. Flip-flop 123 is reset by a pulse applied to its reset input simultaneously with switches 54 and 111 being reset. The binary one output of flip-flop 123 at its principal output, while the flip-flop is in the set state, enables AND gate 124 so that the AND gate passes output pulses of frequency divider 33 that occur once during each period of a Gold code sequence. The pulses coupled through AND gate 124 are applied to a control input of switch 122, to close the switch for a relatively short duration to couple the computed cross correlation value at the output of integrator 34 to the input of computer 121.

The amplitude of each received signal from the different space crafts is a function of the cross correlation function which resulted in lock-up. In particular, the amplitude, as well as phase, of each received signal is reflected in the value of cross correlation between the locally derived and received Gold code sequences. Since noise in the transmission link between the space crafts and receiver 10 will not usually cause more than a relatively small percentage of the received Gold code pulses from a particular space craft to be undetectable and not in phase with the locally derived Gold code sequence, the correlation value which exists between a locally derived Gold code sequence and a received Gold code sequence that was initially transmitted with the same bits as the locally derived sequence will not vary by more than a few percentages and may be considered constant. The amplitude of the locally derived Gold code sequence can also be considered constant, whereby a major factor affecting the amplitude of the correlation function derived from integrator 34, once lock-up has been achieved, is the amplitude of the signal for the space craft transmitting the same sequence as the sequence of channel 11. Hence, the output of integrator 32 which results in lock-up can be considered as directly proportional to the value of $\hat{a}_i$.

The value derived from integrator 32 which resulted in lock-up is coupled to computer 121 for computation of $q_i$ by sampling the output of integrator 32 when frequency divider 33 derives an output. The sampled output of integrator 32 is selectively coupled to memory 125 through switch 126 while a binary one output is derived by AND gate 41. Thereby, memory 125 is loaded with and stores a signal proportional to the cross correlation value associated with the space craft that transmits a Gold code sequence identical to the Gold code sequence derived by generator 33 of channel 11. This value is scaled in memory 125 by an amount equal to the cross correlation of a pair of Gold code sequences having normalized amplitude pulses to derive the value $\hat{a}_i$. The value of $\hat{a}_i$ stored in memory 125 is supplied to computer 121 on a continuous basis to enable the value of $q_i$ to be calculated for each of the $m$ positions 63–101 within the region enclosed by curve 61.

The cross correlation values $g_{ik}(\hat{t}_i, \hat{t}_k)$ can be stored in computer 121 or fed to the computer after lock-up has been achieved. The values of $g_{ik}(\hat{t}_i, \hat{t}_k)$ can be stored in computer 121 since the cross correlation functions of the different locally derived Gold code sequences are known. In the event that the computer actually calculates the cross correlation functions $g_{ik}(\hat{t}_i, \hat{t}_k)$, the output of Gold code generator 25 is coupled to the computer through switch 126 that is closed after lock-up has been achieved by coupling the principal (Q) output of flip-flop 123 to a control input of the switch. Computer 121 responds to the value of $g_{ik}(\hat{t}_i, \hat{t}_k)$ and the value of $\hat{a}_i$ fed to it by each of channels 11, 12, ... 21 to form the quantity of $\Sigma \hat{a}_i g_{ik}(t_i, \hat{t}_k)$.

The following example illustrates the accuracy degradation due to cross correlation products and how the subject invention deals with the cross correlation products to improve the accuracy.

Figure 4A:
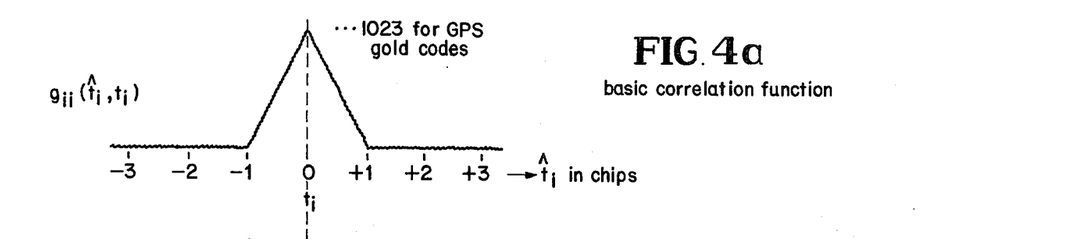
FIGS. 4a–4g are waveforms helpful in describing the problem with which the present invention deals.
Figure 4B:
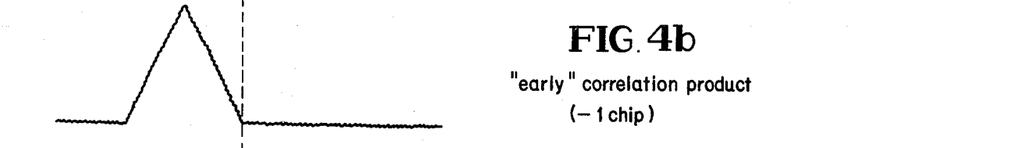
Figure 4C:
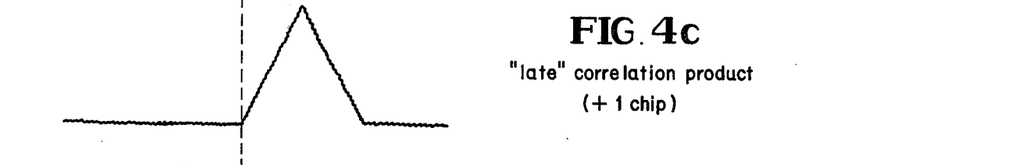
Figure 4D:
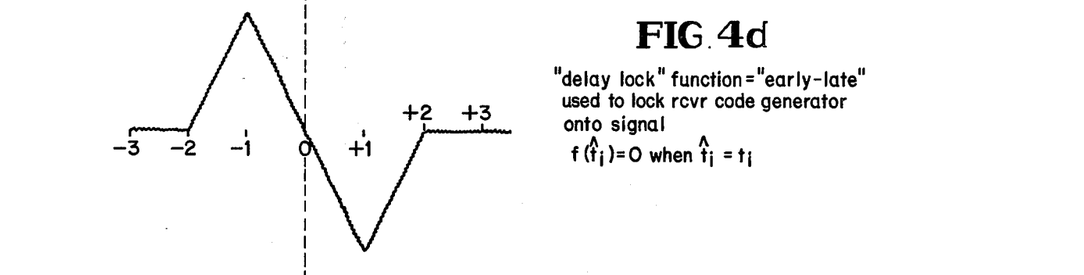

The (auto) correlation peak of a hypothetical received PRN signal and a local generator producing the same code is shown in FIG. 4a, where correlation value is plotted against difference in estimated time of arrival, $\hat{t}_i$ for the received signal, in terms of chip duration, and the epoch time, $t_i$, of the local signal. This function is called $g_{ii}(\hat{t}_i, t_i)$ in the case of the Gold codes described herein. FIGS. 4b and 4c are respectively illustrations of "early" and "late" correlations produced by correlating a locally generated Gold code with the received, same Gold code advanced and retarded by one chip from the code of FIG. 4a. The combination of the early and late correlations to form a delay-lock (DL) characteristic, as derived from a circuit similar to circuit 26, is shown in FIG. 4d. Note that the zero value of the DL characteristic occurs when $\hat{t}_i = t_i$, provided that the estimate and true time-of-arrival are within one chip of each other.

These four figures assumes that there are no other codes present which could produce cross correlations; i.e., if FIG. 2 is considered, receiver 11 is responsive to only one space craft signal.

Figure 4E:
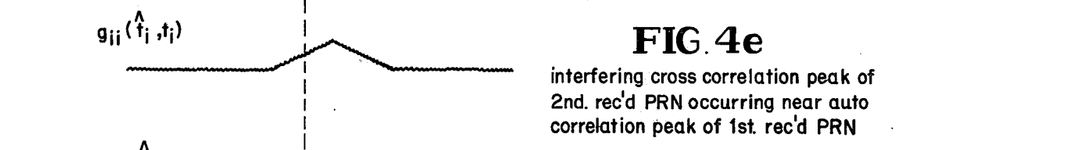
Figure 4F:
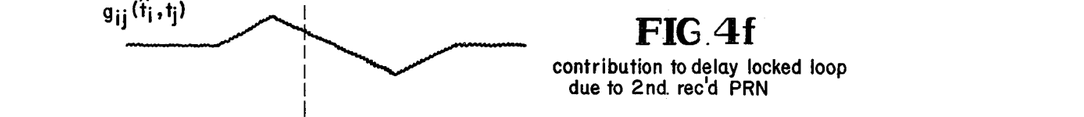
Figure 4G:
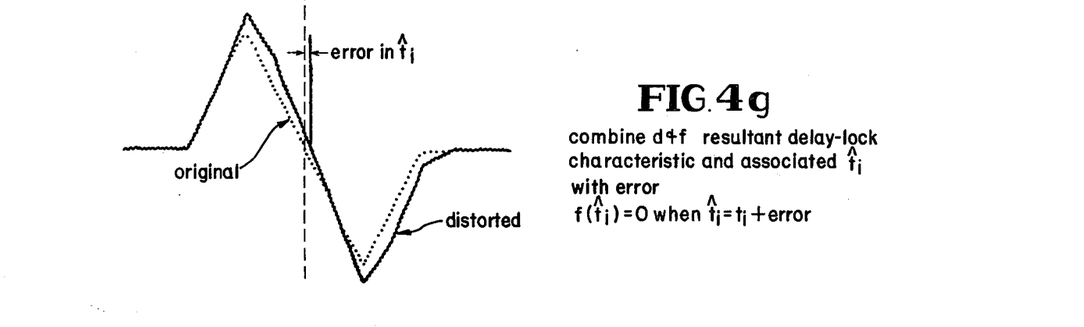
Figure 5A:
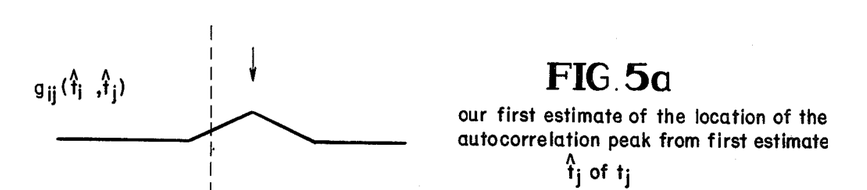
FIGS. 5a–5e are waveforms helpful in describing how the problem is solved.
Figure 5B:
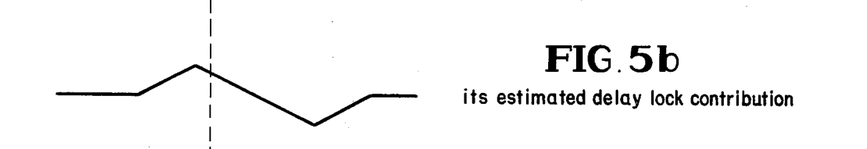
Figure 5C:
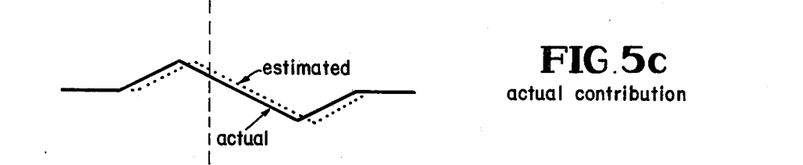
Figure 5D:
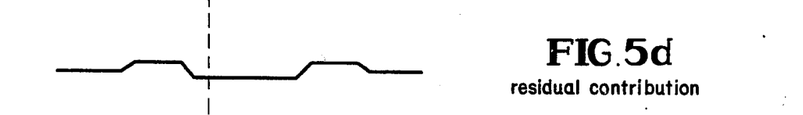

Now suppose that there is a second PRN signal, identified as $j$ (the first was identified as $i$). A possible cross correlation peak between the second PRN signal and the local Gold code sequence discussed in connection with FIGS. 4a–4c is assumed to occur near the auto correlation peak, as shown in FIG. 4e; the magnitude of the peak is assumed to be one fourth that of the auto correlation peak of FIG. 4a, for purposes of this example. The delay lock characteristic between the local Gold code sequence and the second PRN signal, which contributes to the overall delay lock characteristic, is shown in FIG. 4f. The overall delay lock characteristic is shown in FIG. 4g, from which it is apparent that the zero crossing of the net characteristic does not occur at $\hat{t}_i = t_i$, and therefore results in an error in the estimate The application of the present invention to this inaccuracy is shown in FIG. 5. The time of arrival $t_j$ of the second PRN signal will be measured in a similar manner and estimated to be $\hat{t}_j$. Since the relationship of the code sequence, its autocorrelation peak, and the cross correlation peaks of the code with other codes are fixed (when the relative phasing of the various codes is fixed after lock-up has been reached), it is possible to predict the occurrence time of the cross correlation peak between the second signal and the $i$ channel, a result achieved with the intrabit phase shifter. This prediction is indicated by the arrow in FIG. 5a. From this prediction the cross correlation characteristic between the received second PRN and the local generated, phase shifted Gold code sequence is determined as an estimate (FIG. 5b). The contribution of cross correlation characteristic of FIG. 5b to the delay lock characteristic is illustrated in FIG. 5c. FIG. 5c indicates that the estimate of the delay lock characteristic and the actual delay lock characteristic differ bacause of the imperfect knowledge of $t_j$ and $t_i$. FIG. 5d shows the difference between the actual and estimated contributions in FIG. 5d, from which it is apparent that the difference is smaller than the actual contribution.

Figure 5E:
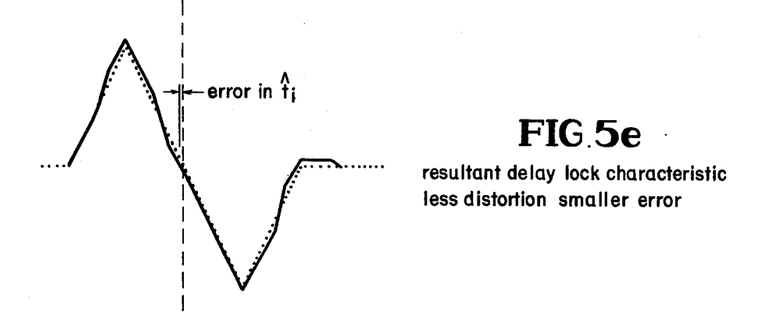

FIG. 5e also shows the resultant delay lock characteristic when the estimated cross correlation is subtracted from the measured correlation. Note that the distortion of the curve is reduced considerably, and that the zero crossing is nearer to $\hat{t}_i = t_i$, thus reducing the error in measurement.

The values of $q_i$ can be calculated by computer 121 simultaneously or sequentially, depending upon the speed of the computer and whether it is operating in real time. After the value of $q_i$ for each of channels 11, 12 ... 21 has been calculated in computer 121, the goodness of fit for the $k$ positions 63–101 is calculated in computer 131 in accordance with:

$$Q = w_{11}q_1^2 + w_{12}q_2^2 + \ldots + w_{21}q_{21}^2$$

where: $w_{11}, w_{12}, \ldots w_{21}$ are weighting factors for the amplitudes of the $q$ signals respectively derived from channels 11, 12, ... 21. If signals are received from fewer than eleven space crafts, the amplitude estimate for the signals from the omitted space crafts will be very small, as will the weighting factors, so that the value of $Q$ reflects signals from only the received signals. For each of the $m$ positions 63–101, computer 131 squares the $wq_i$ signals for each of channels 11, 12 ... 21 an sums the resulting squares to determine the goodness of fit for each of the $m$ positions. The goodness of fit values (Q) for each of the $m$ positions 63–101 are compared against each other and the position having the lowest value of Q is assumed to be the position of receiver 10 within the region defined by curve 61.

To determine the lowest value of Q, the output of computer 131 is supplied to a network including memory 132 and comparator 133 that is responsive to the outputs of computer 131 and memory 132. Initially, memory 132 is loaded with a value larger than any expected value of Q. Comparator 133 responds to its inputs and derives a binary one output when the output of computer 131 is less than the signal stored in memory 132. Thereby, the first output of computer 131 results in computer 133 deriving a binary one signal. The binary one output of comparator 133 is supplied as a control signal to switch 134 to close the switch and enable the calculated value of Q, which resulted in a binary one output of comparator 133, to be fed to memory 132 and replace the previous value stored in the memory.

The binary one output of comparator 133 is coupled to programmer 56, to tag and store the programmer combination of phase shift values associated with the $k$ position that causes the lowest value of Q to be computed. The tagged value of the $k$ position indicates the position of receiver 10 to an accuracy of the closest one of points 62–101 in the region bounded by curve 61.

An alternative to the calculation of Q to determine the probable location of the receiver involves the use of a best fit approach. Extending the two signal example described above in connection with FIG. 5, the next step would be to use the best estimate of $t_i$ to predict the cross correlation products interfering with the estimate $\hat{t}_j$. The improved $\hat{t}_j$ could then be used to predict the cross correlation interfering with $\hat{t}_i$, etc. The iterations could be repeated as long as necessary to remove an adequate amount of error.

To extend this technique to a multitude of simultaneous signals using the iterative approach above would probably result in an extremely large number of computations. To reduce the number of computations, a best fit approach may be used.

In that type of approach, the receiver position would be first determined by prior art techniques; i.e., the values of $t_i$, $t_j$, . . . would be measured from four space craft signals, accepting cross correlation errors, and receiver position computed therefrom. Time of arrival measurements of all other received PRN signals which could produce potentially undesirable cross correlation products are then made.

Following the initial position determination, it would determine the maximum position errors possible from the cross correlation products. It would then array candidate points, as shown in FIG. 3 of the disclosure. The number of points would depend on the accuracy desired and/or the accuracy possible after removal of cross correlations. Now, rather than to compute explicitly what the values of the cross correlations are, the receiver simply checks all candidate points to see how well the estimated times-of-arrival match the cross correlation effects which they predict. The one with the lowest error, probably (but not necessarily) squared error, is selected as the best estimate of position.

While there has been described and illustrated one specific embodiment of the invention, it will be clear that variations in the details of the embodiment specifically illustrated and described may be made without departing from the true spirit and scope of the invention as defined in the appended claims.

What is claimed is:

1. Apparatus for enabling a determination to be made of the position of a receiver relative to the differing positions of a plurality of sources that transmit pseudo random type sequences, each of said sources transmitting a different, known sequence, comprising means responsive to the sequences transmitted to and received at the receiver for initially determining the position of the receiver within an area having a predetermined size determined by the cross correlations of the pseudo random type sequences, said initial determining means including: a plurality of internally derived sources of the transmitted pseudo random sequence and means for phase locking each of the internally derived sequences to a different one of the received sequences; the improvement comprising: means activated when the received and internal sequences are phase locked for determining the position of the receiver to an accuracy greater than the initially determined position, said last named means including: means for individually varying the relative phases of the internally derived pseudo random sequences over the interval of one chip of the sequence to change the effective position of the receiver within the area, and means for combining the received sequences and the phase varied internal sequences.

2. The apparatus of claim 1 wherein the means for combining includes means for deriving a first indication of the cross correlation function of the received sequences with the phase varied internal sequences, and means for combining the first indications to derive a second indication of the likelihood of the effective position being the closest to the actual position of the receiver.

3. The apparatus of claim 2 wherein the means for varying includes means for varying the phases so that the receiver is effectively moved to a plurality of positions within the area, whereby different first and second indications are derived for each of the effective positions, and said combining means includes means for comparing the second indications to derive an indication of the effective position closest to the actual position.

4. The apparatus of claim 3 wherein the means for varying the relative phases includes means for varying the phases in discrete steps.

5. The apparatus of claim 2 wherein the means for varying the relative phases includes means for varying the phases in discrete steps.

6. The apparatus of claim 1 further including means for deriving an indication of the amplitude of each received sequence, and means for supplying the amplitude indication to the means for combining.

7. The apparatus of claim 1 wherein said phase locking means includes acquisition means for adjusting the relative phase of the internally derived sequences until there is chip overlap between the internal and received sequences, said acquisition means including means for calculating the cross correlation function of the received and locally derived sequences, and said combining means including said means for calculating the cross correlation function.

8. Apparatus for enabling the position of a receiver responsive to clear acquisition (C/A) signals derived from multiple space crafts of the Global Positioning System to be determined to an accuracy of greater than otherwise possible in response to the C/A signals, each of the C/A signals having the same carrier frequency and a different, predetermined Gold code sequence having a chipping rate of 1.023 megabits per second whose cross correlation products can prevent the position determination to be more accurate than to within 300 meters, comprising means responsive to C/A signals received at the receiver for separately detecting the C/A signal from each space craft, said detecting means including: means for locally deriving the different, predetermined Gold code sequences, means for acquiring the received sequences, said acquiring means including: means for calculating first cross correlation functions of the received and locally derived Gold code sequences over a Gold code sequence interval, and means for adjusting the phase of the locally derived Gold code sequences to achieve phase lock between each received and locally derived Gold code sequence; means responsive to the separately detected C/A signals for computing the receiver position to within 300 meters; the improvement comprising: means activated after phase lock has been achieved for individually varying the relative phase of the internally derived Gold code sequences over the interval of one chip of the sequence whereby there are derived by the calculating means signals representing second cross correlation functions of the received Gold code sequences and the locally derived Gold code sequences representing different positions within the computed 300 meter position, means for deriving signals representing third cross correlation functions of the internally derived Gold code sequences for the different positions within the computed 300 meter position, means for deriving a signal indicative of the amplitude of the signal from each space craft, and means for combining the signals representing the second and third cross correlation functions with the amplitude representing signal to enable the receiver position to be determined to an accuracy greater than 300 meters.

9. The apparatus of claim 8 further including means for comparing the values of the combined signals for the different positions and for indicating the combined signal having an extreme value, and means responsive to the comparing means for indicating the relative phase of the internally derived Gold code sequences that resulted in the extreme value.

10. The apparatus of claim 8 wherein the means for varying the relative phases includes means for varying the phases in discrete steps.

11. A method for enabling a determination to be made of the position of a receiver comprising transmitting different, known pseudo random type sequences from a plurality of sources having different positions, at the receiver: receiving the transmitted sequences, in response to the received sequences initially determining the position of the receiver relative to the positions of the sources within an area having a predetermined size determined by the cross correlation products of the pseudo random type sequences by phase locking each of a plurality of internally derived pseudo random sequences to a different one of the received sequences, the internally derived and transmitted sequences being the same, the improvement comprising: determining the position of the receiver to an accuracy greater than the initially determined position when the received and internal sequences are phase locked by individually varying the relative phases of the internally derived pseudo random sequences over the interval of one chip of the sequence to change the effective position of the receiver within the area, and combining the received sequences and the phase varied internal sequences.

12. The method of claim 11 wherein the received and phased varied sequences are combined by cross correlating the received sequences with the phase varied internal sequences, and combining the cross correlated functions to derive an indication of the likelihood of the effective position being the closest to the actual position of the receiver.

13. The method of claim 12 wherein the phases are varied so that the receiver is effectively moved to a plurality of positions within the area, whereby different ones of said cross correlations and said indications are derived for each of the effective positions, and said combining step includes comparing said indications to derive an indication of the effective position closest to the actual position.

14. The method of claim 13 wherein the relative phases are varied in discrete steps.

15. The method of claim 11 further including deriving an indication of the amplitude of each received sequence, and combining the amplitude indication with the received and phase varied internal sequences.

16. Apparatus for determining the position of a receiver relative to multiple transmitting sources of a single carrier frequency, each of said sources deriving a different, predetermined pseudo random code sequence having a chip rate that normally prevents the position determination to be more accurate than to within a predetermined distance, comprising means for separately cross correlating the received code sequences with a plurality of locally derived pseudo random sequences that are the same as the transmitted sequences, means for adjusting the phase of the locally derived code sequences until there is a maximum first cross correlation value between each of the received and locally derived code sequences, means for combining four of the detected received sequences and for computing the position of the receiver to the predetermined accuracy, means for determining the receiver position to an accuracy greater than the predetermined accuracy, said last named means comprising: means for individually varying the relative phase of the internally derived code sequences over the interval of one chip of each sequence so that there are derived second cross correlation values indicative of the received and locally derived code sequences, the second cross correlation values representing different positions within the predetermined position, means for deriving third cross correlation values indicative of the correlations between the internally derived code sequences for the different positions within the predetermined position region, means responsive to the received signals for deriving a signal indicative of the amplitude of each received signal, means for combining indications of the second and third cross correlation values with the indications of the received signal amplitudes, means for comparing the different combined signals to remove the effects of the cross correlation values, and means for indicating the minimum value of the combined signals.

17. A method of determining the position of a receiver relative to multiple transmitting sources of a single carrier frequency, each of said sources deriving a different, predetermined pseudo random code sequence having a chip rate that normally prevents the position determination to be more accurate than to within a predetermined distance, comprising separately cross correlating the received code sequences with a plurality of locally derived pseudo random sequences that are the same as the transmitted sequences, adjusting the phase of the locally derived code sequences until there is a maximum first cross correlation value between each of the received and locally derived code sequences, combining four of the detected received sequences, from the four combined detected received sequences, computing the position of the receiver to the predetermined accuracy, determining the receiver position to an accuracy greater than the predetermined accuracy, the last named step comprising: individually varying the relative phase of the internally derived code sequences over the internal of one chip of each sequence so that there are derived second cross correlation values indicative of the received and locally derived code sequences, the second cross correlation values representing different positions within the predetermined position, deriving third cross correlation values indicative of the correlations between the internally derived code sequences for the different positions within the predetermined position region, in response to the received signals deriving a signal indicative of the amplitude of each received signal, combining indications of the second and third cross correlation values with the indications of the received signal amplitudes, comparing the different combined signals to remove the effects of the cross correlation values, and indicating the minimum value of the combined signals.

* * * * *